United States Patent
Kuo et al.

(10) Patent No.: US 8,664,996 B2
(45) Date of Patent: Mar. 4, 2014

(54) CLOCK GENERATOR AND METHOD OF GENERATING CLOCK SIGNAL

(75) Inventors: Chun-Ming Kuo, Hsinchu (TW); Wen-Chi Chao, Hsinchu (TW); Keng-Jan Hsiao, Taoyuan County (TW); Song-Yu Yang, Chiayi (TW); Chun-Chi Chen, New Taipei (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 2 days.

(21) Appl. No.: 13/495,004

(22) Filed: Jun. 13, 2012

(65) Prior Publication Data

US 2013/0169338 A1 Jul. 4, 2013

Related U.S. Application Data

(60) Provisional application No. 61/582,708, filed on Jan. 3, 2012.

(51) Int. Cl.
*G06F 1/04* (2006.01)
*H03K 3/00* (2006.01)

(52) U.S. Cl.
USPC .......................................... 327/291; 327/293

(58) Field of Classification Search
USPC ......... 327/261, 263, 264, 268, 272, 276–278, 327/284, 285, 270, 283, 290, 291, 293
See application file for complete search history.

(56) References Cited

U.S. PATENT DOCUMENTS

| | | | |
|---|---|---|---|
| 5,291,528 A * | 3/1994 | Vermeer | 375/354 |
| 5,987,244 A | 11/1999 | Kau et al. | |
| 7,065,668 B2 * | 6/2006 | Kosuda et al. | 713/500 |
| 2008/0288804 A1 | 11/2008 | Gorti et al. | |

OTHER PUBLICATIONS

Griffith, "A 65nm CMOS DCXO System for Generating 38.4MHz and a Real Time Clock from a Single Crystal in 0.09mm2", IEEE RFIC Symposium, 2010.
Denier, "Analysis and Design of an Ultralow-Power CMOS Relaxation Oscillator", IEEE Trans. Circuits and Systems, Aug. 2010.
Ruffieux, "Silicon-Resonator-Based, 3 µA Real-Time Clock with ±5ppm Frequency Accuracy", ISSCC, 2009.

* cited by examiner

*Primary Examiner* — Hai L Nguyen
(74) *Attorney, Agent, or Firm* — Winston Hsu; Scott Margo

(57) ABSTRACT

A clock generator utilized for providing a clock signal includes: a first oscillator and a switching circuit. The switching circuit is coupled to the first oscillator and a second oscillator, and utilized for receiving a first oscillating signal generated from the first oscillator and a second oscillating signal generated from the second oscillator, and selecting one of the first oscillating signal and the second oscillating signal as the clock signal according to a status signal.

11 Claims, 7 Drawing Sheets

CLOCK GENERATOR AND METHOD OF GENERATING CLOCK SIGNAL

CROSS REFERENCE TO RELATED APPLICATIONS

This application claims the benefit of priority to U.S. Provisional Application Ser. No. 61/582,708, filed on Jan. 3, 2012, the contents of which are incorporated herein by reference.

BACKGROUND

Cellular phones or other electronic devices are the devices people use on a daily basis, which utilize processors to handle lots of signal manipulation calculations, deal with commands and control signaling, and coordinate other operations of other internal circuits of the cellular phones or the electronic devices.

Generally, a processor or other internal circuits of the cellular phone or the electronic device requires two external crystal oscillators. Please refer to FIG. 1, which schematically illustrates clock generation architecture of a conventional electronic device 10. A first crystal oscillator 110 provides a low frequency clock signal to internal circuits 130 for mobile communications in a standby state mode, such as a sleep/wake-up clock and real-time clock (RTC), while a second crystal oscillator 120 provides a high frequency clock signal to internal circuits 130 for high frequency applications.

Although the crystal oscillator has good characteristics, such as low temperature coefficient and moderate power consumption, and it is also able to provide an accurate and precise clock signal, the hardware cost of the crystal oscillator is still considerable.

SUMMARY

It is one objective of the present invention to provide clock switching architecture. With the clock switching architecture of the present invention, only one crystal oscillator is needed in an electronic device. Hence, the hardware cost in the present invention is significantly reduced.

Besides, since the accuracy of the crystal oscillator is usually more accurate than other types of the oscillator, it is another objective of the present invention to provide a clock generator with good clock accuracy. Additionally, the power consumption of the clock generator of the present invention does not exceed the total power consumption of the combination of two crystal oscillators.

According to one exemplary embodiment of the present invention, a clock generator is provided. The clock generator is utilized for providing a clock signal, and comprises: a first oscillator and a switching circuit. The switching circuit is coupled to the first oscillator and a second oscillator. The switching circuit is utilized for receiving a first oscillating signal generated from the first oscillator and a second oscillating signal generated from the second oscillator. Additionally, the switching circuit is utilized for selecting one of the first oscillating signal and the second oscillating signal as the clock signal according to a status signal.

According to another exemplary embodiment of the present invention, a method of generating a clock signal is provided, and comprises: utilizing a first oscillator to generate a first oscillating signal; receiving the first oscillating signal and a second oscillating signal generated from a second oscillator; and selecting one of the first oscillating signal and the second oscillating signal as the clock signal according to a status signal.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following descriptions and claims to refer to particular system components. As one skilled in the art will appreciate, manufacturers may refer to a component by different names. This document does not intend to distinguish between components that differ in name but not differ in functionality. In the following discussion and in the claims, the terms "include", "including", "comprise", and "comprising" are used in an open-ended fashion, and thus should be interpreted to mean "including, but not limited to . . . " The terms "couple" and "coupled" are intended to mean either an indirect or a direct electrical connection. Thus, if a first device couples to a second device, that connection may be through a direct electrical connection, or through an indirect electrical connection via other devices and connections.

Figure 1:
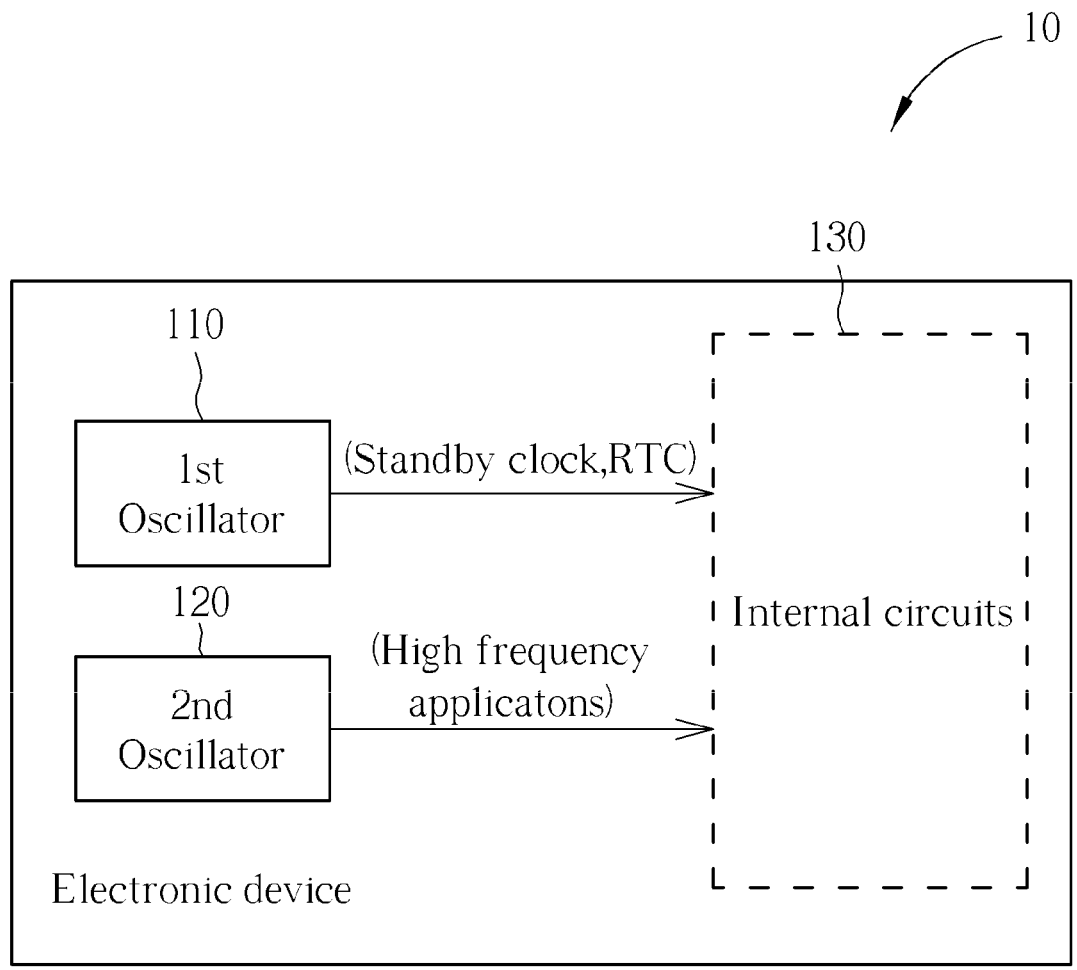
FIG. 1 illustrates conventional clock generation architecture of an electronic device.
Figure 2:
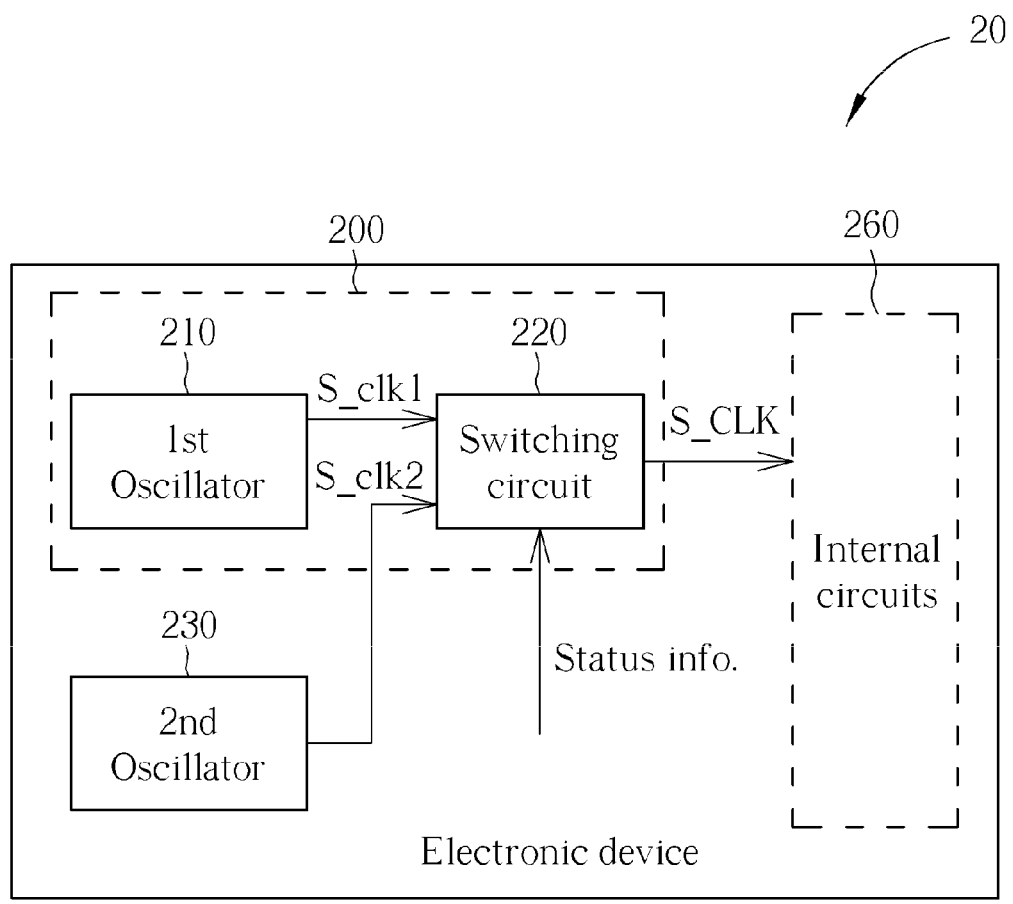
FIG. 2 illustrates a clock generator according to one exemplary embodiment of the present invention.

Please refer to FIG. 2, which schematically illustrates a clock generator according to one embodiment of the present invention. As shown in FIG. 2, a clock generator 200 is utilized for providing a clock signal S_CLK as a clock reference for internal circuits 260 of an electronic device 20, such as a processor, a transceiver, and so on. The electronic device 20 may be a handheld device, a cellular phone, a smart phone, a tablet computer, and so on. The clock generator 200 includes a first oscillator 210 and a switching circuit 220. The first oscillator 210 generates a first oscillating signal S_clk1. In addition, the electronic device 20 further includes a second oscillator 230 which generates a second oscillating signal S_clk2. The switching circuit 220 is coupled to the first oscillator 210 and the second oscillator 230, and is utilized for receiving the first oscillating signal S_clk1 and the second oscillating signal S_clk2. The switching circuit 220 selects one of the first oscillating signal S_clk1 and the second oscillating signal S_clk2 as the clock signal S_CLK based on status information.

In one embodiment, the switching circuit 220 selects one of the oscillating signals (S_clk1 and S_clk2) as the clock signal S_CLK according to a status signal S_stat that is indicative of a power supply status of the electronic device 20. However, this invention is not limited in scope to the signal indicative of a power supply status of the electronic device 20. In other embodiments of the invention, it is also possible to select the one of the oscillating signals as the clock signal S_CLK according to other status information related to the clock generator 200 and/or the electronic device 20.

Figure 3:
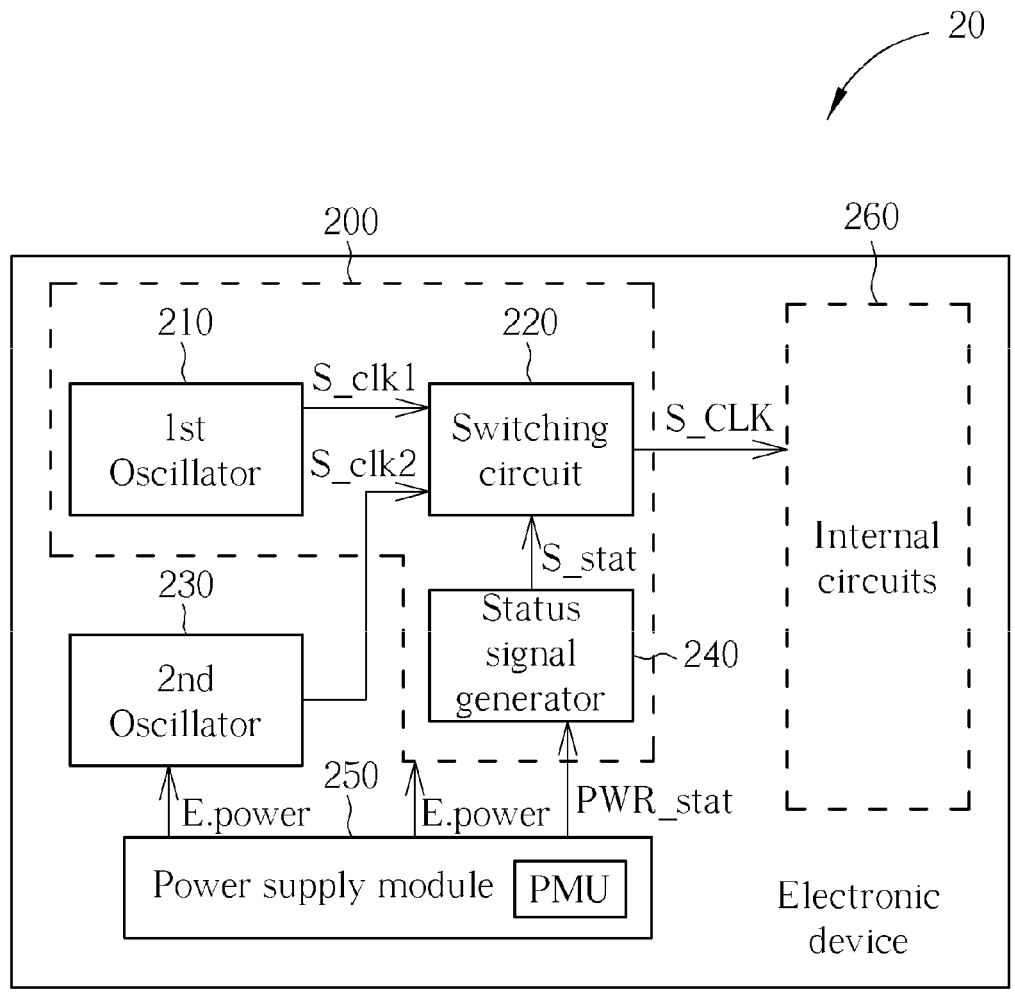
FIG. 3 illustrates a clock generator according to another exemplary embodiment of the present invention.

In one embodiment, the clock generator 200 further includes a status signal generator 240 as illustrated in FIG. 3, which is utilized for monitoring a power state of a power supply module 250, and generating the status signal S_stat according to the monitored power state. The power supply module 250 may be a battery or other types of power supply apparatus, which supplies electrical power to the electronic device 20 including the clock generator 200, the second oscillator 230, and the internal circuits 260. If the power supply module 250 is removed from the electronic device 20 or temporarily disconnected from the electronic device 20, a power state of the power supply module 250 will be indicated as low or empty. At this time, if the electronic device 20 has an auxiliary power supply module (not shown in FIG. 3), such as a capacitor, a mercury battery or a backup battery), limited electrical power can be supplied to the electronic device 20, which maintains some necessary functions of the electronic device 20. For example, the electronic device 20 requires keeping track of the current time. If the real-time clock stops operating or the oscillator stops providing the clock reference due to the lack of electrical power, the electronic device 20 will fail to keep track of the current time correctly. This may cause some other functions of the electronic device 20 to be invalid (e.g. time displaying). Under this condition, the auxiliary power supply module can provide the electrical power for a short period of time to maintain the tracking of the current time.

To more economically utilize the limited electrical power of the auxiliary power supply module, the switching circuit 220 selects the oscillating signal which is generated from the oscillator which consumes relatively less electrical power. Assuming that a power consumption of the first oscillator 210 is lower than a power consumption of the second oscillator 230, the status signal generator 240 generates the status signal S_stat having a specific level to indicate a low/empty power state when the power supply module 250 is removed from the electronic device 20 or temporarily disconnected from the electronic device 20. Then, the status signal S_stat having the specific level causes the switching circuit 220 to select the first oscillating signal S_clk1 as the clock signal S_CLK. Also, the operation of the second oscillator 230 may be terminated by a controller (not shown in FIG. 3) of the electronic device 20 for reducing power consumption.

In one embodiment, if the second oscillating signal S_clk2 is more accurate and precise than the first oscillating signal S_clk1, the switching circuit 220 will select the second oscillating signal S_clk2 as the clock signal S_CLK for the clock reference when the electrical power of the power supply module 250 is indicated as sufficient. That is, when the power supply module 250 is re-connected to the electronic device 20 after it is removed or after it is temporarily disconnected from the electronic device 20, the status signal generator 240 generates the status signal S_stat having another specific level to indicate a high power state. Afterward, the switching circuit 220 will select the second oscillating signal S_clk2 as the clock signal S_CLK. Also, the operation of the first oscillator 210 may be terminated for reducing power consumption.

Figure 4:
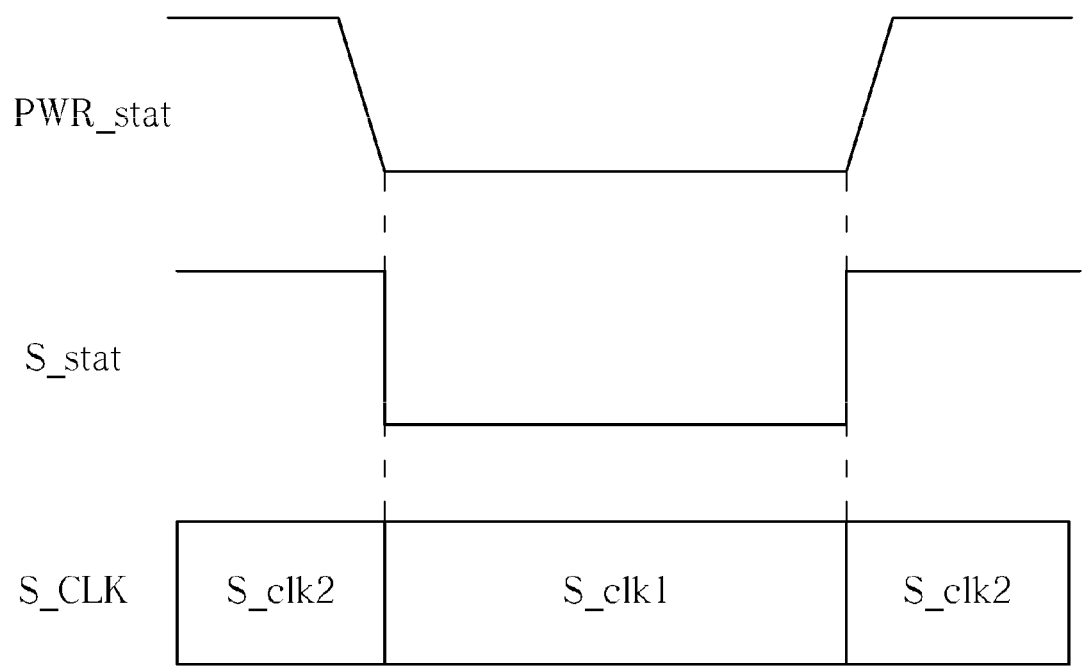
FIG. 4 illustrates a timing chart of a status signal, an indication signal and selection of a clock signal according to one exemplary embodiment of the present invention.

Please refer to FIG. 4. A timing chart of the status signal S_stat, the power state indication signal PWR_stat, and the selection of the clock signal S_CLK are illustrated in FIG. 4.

In one embodiment, the status signal generator 240 generates the status signal S_stat according to output information of the power management unit (PMU) which governs the power supply module 250. By measuring an output voltage of the power supply module 250, the PMU generates a power state indication signal PWR_stat. If the power supply module 250 is connected to electronic device 20 and is able to supply sufficient electrical power, the power state indication signal PWR_stat will be asserted, which causes the status signal S_stat to be asserted. On the other hand, if the power supply module 250 is removed from the electronic device 20, temporarily disconnected from electronic device 20, or is not able to supply sufficient electrical power, the power state indication signal PWR_stat will be de-asserted, which causes the status signal S_stat to be de-asserted as well. Accordingly, the switching circuit 220 selects one of the first oscillating signal S_clk1 and the second oscillating signal S_clk2.

Figure 5:
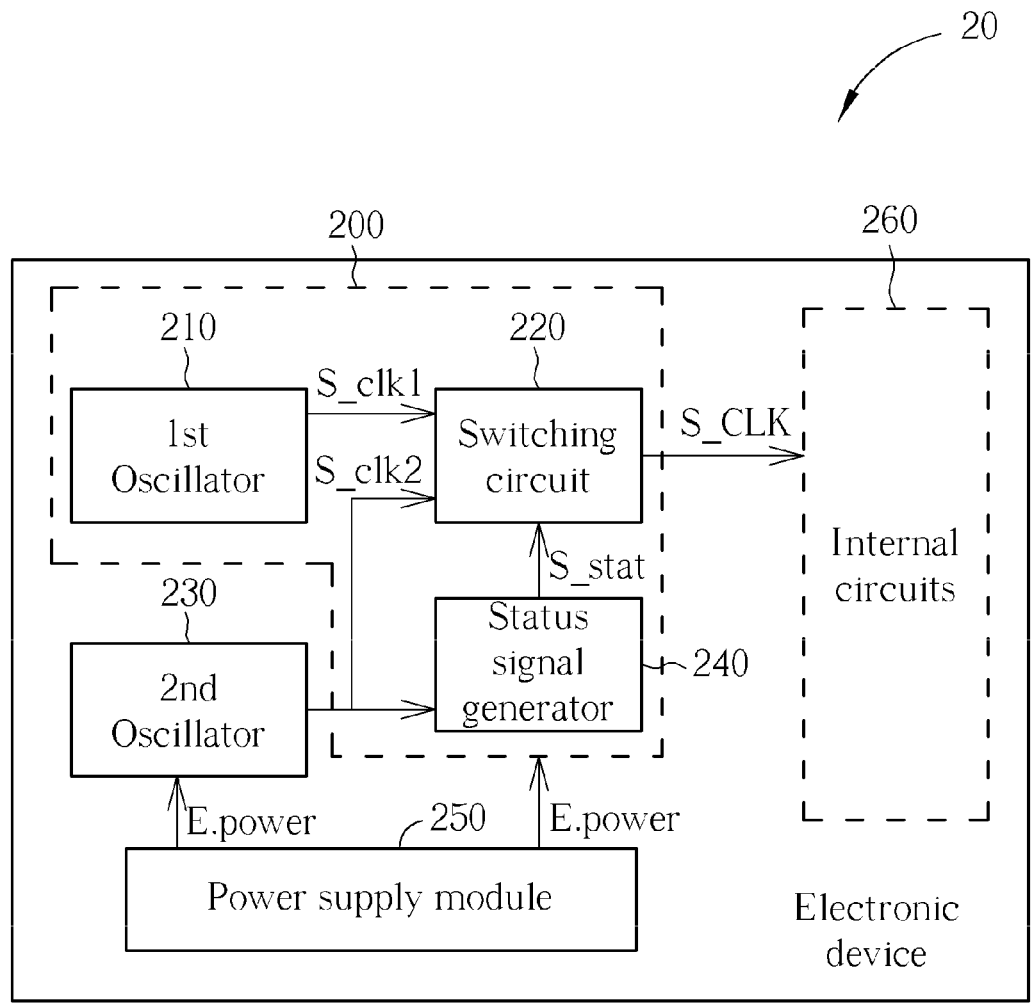
FIG. 5 illustrates a clock generator according to still another exemplary embodiment of the present invention.

According to another embodiment of the present invention, the status signal generator 240 may generate the status signal S_stat in an alternative way, which is illustrated in FIG. 5. In this embodiment, the status signal generator 240 monitors an operational status of the second oscillator 230 to detect the power state of the power supply module 250, and accordingly generates the status signal S_stat according to the monitored operational status. Specifically, the status signal generator 240 monitors whether the second oscillator 230 oscillates to generate the second oscillating signal S_clk2 or not. The principle is that the second oscillator 230 requires relatively high electrical power to operate due to high frequency operating, and it will quickly stop oscillating as long as the power supply module 250 is removed from the electronic device 20 or temporarily disconnected to the electronic device 20. On the other hand, the second oscillator 230 will oscillate to generate the second oscillating signal S_clk2 if the electrical power of the power supply module 250 is sufficient. Hence, the switching circuit 220 selects signals according to the second oscillating signal S_clk2.

Figure 6:
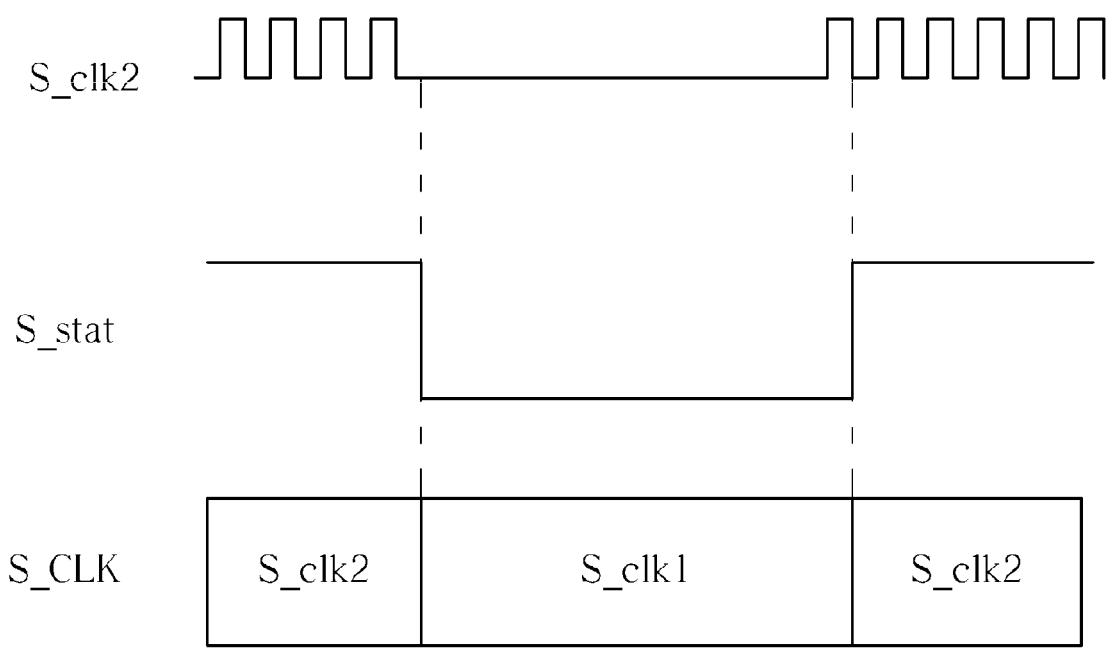
FIG. 6 illustrates a timing chart of a status signal, an oscillating signal and selection of a clock signal according to another exemplary embodiment of the present invention.

Please refer to FIG. 6. A timing chart of the status signal S_stat, the second oscillating signal S_clk2, and the selection of the clock signal S_CLK are illustrated in FIG. 6. If the status signal generator 240 detects that the second oscillator 230 stop generating clock pulses for a period of time, the status signal generator 240 generates the status signal S_stat having a specific level to indicate a low/empty power state of the power supply module 250, which causes the switching circuit 220 to select the first oscillating signal S_clk1 as the clock signal S_CLK. Alternatively, the status signal generator 240 may immediately generate the status signal S_stat having the specific level once it is detected that the second oscillator 230 stop generating clock pulses, which causes the switching circuit 220 to select the first oscillating signal S_clk1 as the clock signal S_CLK. Furthermore, as long as the status signal generator 240 monitors that the second oscillator 230 starts to generate clock pulses again, the status signal generator 240 generates the status signal S_stat having another specific level to indicate a high power state of the power supply module 250, which causes the switching circuit 220 to select the second oscillating signal S_clk2 as the clock signal S_CLK. Similarly, the status signal generator 240 may generate the status signal S_stat having another specific level immediately or after a period of time if it is detected that the second oscillator 230 starts to generate clock pulses. When switching circuit 220 selects the second oscillating signal S_clk2 as the clock signal, the operation of the first oscillator 210 may be terminated.

Moreover, in order for different applications in the electronic device 20, each of the first oscillator 210 and the second oscillator 230 may have an oscillator core which respectively oscillates at a frequency LF1 and a frequency HF1 to generate a first original oscillating signal S_osc1 and a second original oscillating signal S_osc2 in an embodiment. For example, the first original oscillating signal S_osc1 is provided for mobile communications in standby mode, such as sleep/wake-up clock, RTC, and so on. The second original oscillating signal S_osc2 is originally provided for high frequency applications. Hence, the first original oscillating signal S_osc1 and the second original oscillating signal S_osc2 requires frequency dividing before they are used as the clock reference for the real-time clock. In this embodiment, the first oscillator 210 and the second oscillator 230 may have frequency dividers, which respectively perform frequency-dividing operations on the first original oscillating signal S_osc1 and the second original oscillating signal S_osc2 to generate the first oscillating signal S_clk1 and the second oscillating signal S_clk2. After frequency dividing, the first oscillating signal S_clk1 and the second oscillating signal S_clk2 will have the same frequency (e.g. 32.768 kHz or 32 kHz). However, this is not a limitation of the present invention. In other embodiments of the present invention, there may be only one or no frequency-divider in the first oscillator 210 and the second oscillator 230.

As mentioned before, since the first oscillator 210 is meant to provide clock signal for the real-time clock with low power consumption, it could therefore be a silicon oscillator (which generally has low power consumption and reduced hardware cost). Also, it may be embedded into a same IC which includes the switching circuit 220 to reduce chip size. Additionally, as the temperature coefficient of the silicon oscillator is unfavorable, it is advantageously to implement the second oscillator 230 with a crystal oscillator to provide a more accurate clock signal for the real-time clock when electrical power is sufficient since the temperature coefficient of the crystal oscillator is lower than that of the silicon oscillator.

Figure 7:
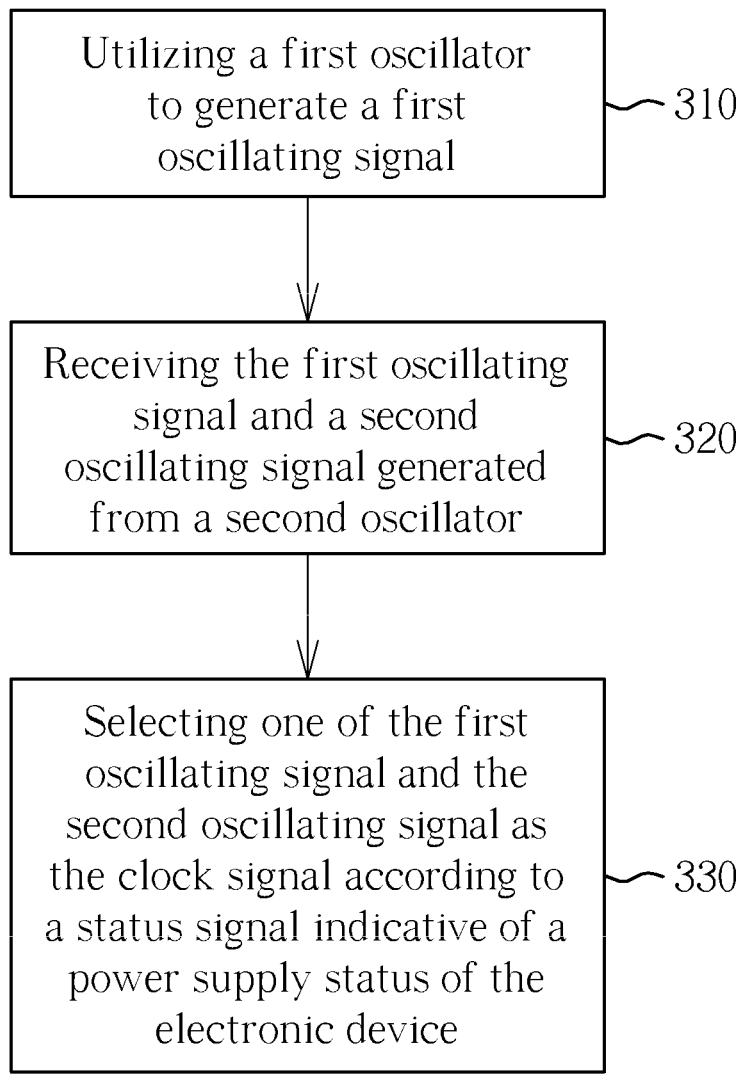
FIG. 7 illustrates a flow chart of a method of generating a clock signal according to one exemplary embodiment of the present invention.

Based on the clock generator as mentioned above, the present invention also provides a method of generating a clock signal. A flow chart of the method of generating a clock signal according to one embodiment is illustrated in FIG. 7. Please note that under the condition that substantially the same result is achieved, the steps illustrated in FIG. 7 need not be in the exact order shown and need not be contiguous; that is, other steps can be intermediate.

At first, in Step 310, a first oscillator is utilized to generate a first oscillating signal. Accordingly, the flow goes to Step 320, the first oscillating signal and a second oscillating signal generated from a second oscillator will be received. In Step 330, one of the first oscillating signal and the second oscillating signal is selected as the clock signal according to a status signal indicative of a power supply status of the electronic device. In one embodiment of the present invention, the method of generating the clock signal further comprises: monitoring a power state of a power supply module which supplies power to the first oscillator; and generating the status signal according to the monitored power state. In an alternative embodiment of the present invention, the method of generating the clock signal further comprises: monitoring an operational status of the second oscillator to detect a power state of a power supply module which supplies power to the first generator and the second oscillator; and generating the status signal according to the monitored operational status.

As the principles and operations in the method of the present invention are similar to those of the clock generator mentioned above, detailed descriptions about the method of the present invention are omitted here for the sake of brevity.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment. Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

For some reasons, the user sometimes needs to disconnect/remove the battery from the electronic device. For example, when the battery runs out or the battery fails to provide electrical power, the user needs to replace the battery with a new one. Moreover, if the electronic device is a cellular phone, the user has to disconnect/remove the battery before he/she replaces the SIM card with a different one or install a new SIM card. Therefore, the battery will be temporality disconnected from the electronic device. In the present invention, the silicon oscillator with low power consumption will be used to provide the clock reference for RTC when the battery is not connected to the electronic device, which economically consumes the limited power supplied by the auxiliary power supply module and maintains the timing record of the electronic device. Once the battery is re-connected to the electronic device and supplies sufficient electrical power, the crystal oscillator with high accuracy will be used to provide the clock reference for RTC to ensure that the electronic device keeps track of correct real time. Beside, since the electronic device utilizing the clock switching architecture of the present invention only requires one external crystal oscillator (the other is replaced with the silicon oscillator), the hardware cost will be reduced compared to the conventional combination of two crystal oscillators.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A clock generator, for providing a clock signal, comprising:
    a first oscillator;
    a switching circuit, coupled to the first oscillator and a second oscillator, for receiving a first oscillating signal generated from the first oscillator and a second oscillating signal generated from the second oscillator, and selecting one of the first oscillating signal and the second oscillating signal as the clock signal according to a status signal; and
    a status signal generator, for monitoring an operational status of the second oscillator to detect a power state of a power supply module which supplies power to the clock generator and the second oscillator, and generating the status signal according to the monitored operational status.

2. The clock generator of claim 1, wherein the status signal is indicative of a power supply status of an electronic device.

3. The clock generator of claim 1, wherein the second oscillator is a crystal oscillator and the first oscillator is a silicon oscillator.

4. The clock generator of claim 1, wherein the first oscillator and the switching circuit are disposed inside an integrated circuit.

5. The clock generator of claim 1, wherein a frequency of an output generated from an oscillator core of the first oscillator is lower than a frequency of an output generated from an oscillator core of the second oscillator.

6. The clock generator of claim 1, wherein a power consumption of the first oscillator is lower than a power consumption of the second oscillator.

7. A method of generating a clock signal, comprising:
utilizing a first oscillator to generate a first oscillating signal;
receiving the first oscillating signal and a second oscillating signal generated from a second oscillator;
selecting one of the first oscillating signal and the second oscillating signal as the clock signal according to a status signal;
monitoring an operational status of the second oscillator to detect a power state of a power supply module which supplies power to the first generator and the second oscillator; and
generating the status signal according to the monitored operational status.

8. The method of claim 7, wherein the status signal is indicative of a power supply status of an electronic device.

9. The method of claim 7, wherein a power consumption of the first oscillator is lower than a power consumption of the second oscillator.

10. The method of claim 7, wherein the second oscillator is a crystal oscillator and the first oscillator is a silicon oscillator.

11. The method of claim 7, wherein the first oscillator and the switching circuit are disposed inside an integrated circuit.

* * * * *